March 15, 1966 C. DIXON 3,240,945
SHUTTER DRIVE FOR PHOTOSENSITIVE PINHOLE DETECTORS
Filed June 1, 1962 2 Sheets-Sheet 1
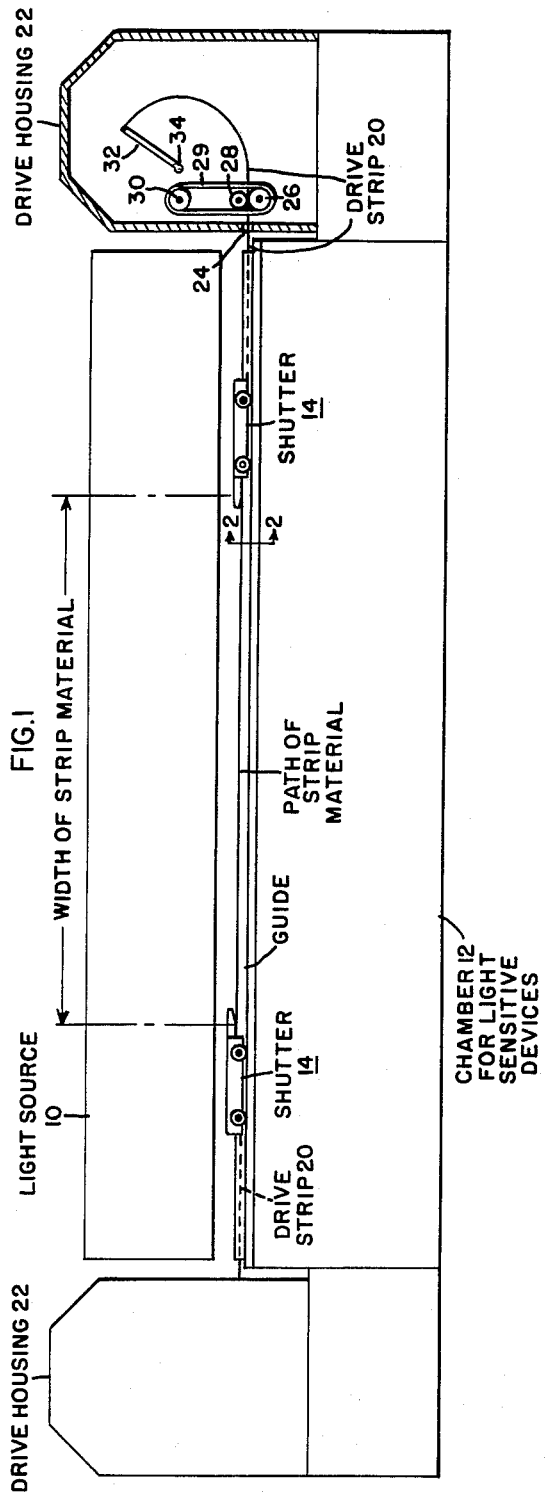
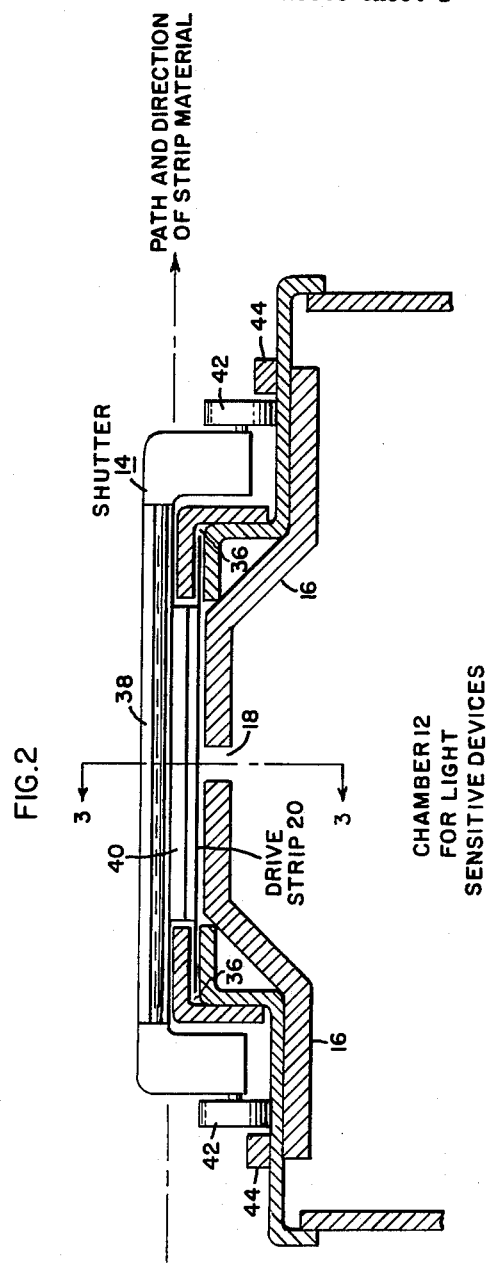
INVENTOR:
CORBIN DIXON,
BY *James G. Williams*
HIS ATTORNEY.

March 15, 1966 C. DIXON 3,240,945
SHUTTER DRIVE FOR PHOTOSENSITIVE PINHOLE DETECTORS
Filed June 1, 1962 2 Sheets-Sheet 2
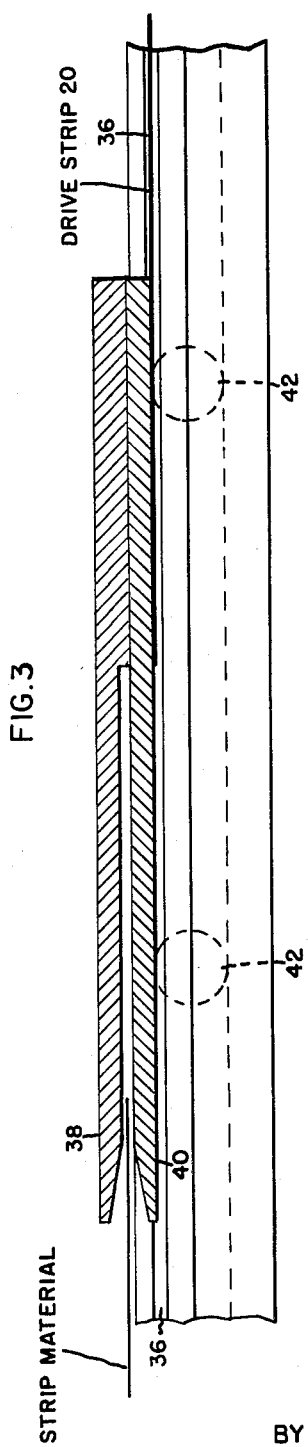
INVENTOR:
CORBIN DIXON,
BY James G. Williams
HIS ATTORNEY.

United States Patent Office 3,240,945
Patented Mar. 15, 1966

3,240,945
SHUTTER DRIVE FOR PHOTOSENSITIVE
PINHOLE DETECTORS
Corbin Dixon, Waynesboro, Va., assignor to General
Electric Company, a corporation of New York
Filed June 1, 1962, Ser. No. 199,320
5 Claims. (Cl. 250—219)

The invention relates to a shutter drive for pinhole detectors, and particularly to such a shutter drive for improving certain features of existing pinhole detectors.

One present technique for detecting small holes, usually referred to as pinholes which may exist in the thickness dimension of strip material, utilizes a light source and a light sensitive device which are positioned on opposite sides of the path of travel of the strip material. As long as the strip material is free from pinholes, no light from the source reaches the light sensitive device. However, when a pinhole in the strip material passes between the source and light sensitive device, light from the source may reach the light sensitive device. The light sensitive device responds and provides a signal that indicates a pinhole has been detected. Some appropriate action, such as marking or noting the pinhole, may be initiated in response to the signal. In order that stray light be prevented from reaching the light sensitive device and thus causing a false indication, the light sensitive device is usually enclosed in a chamber having only a narrow slot for admitting light. In addition, shutters are provided at each of the two opposite side edges of the strip material to totally or partially reduce stray light which would otherwise reach the light sensitive device by traveling around the side edges of the strip material. It is desirable that these shutters be positioned as near the edge of the strip material as possible so as to prevent as much stray light as possible from reaching the light sensitive device. Thus, the shutters should be capable of being moved back and forth so as to be positioned near the edges of the strip material at all times. This is particularly true where the edges of the strip material are rough or where the width of the strip material varies. A number of devices for moving or driving the shutters have been devised, these devices including weights, racks and pinions, and hydraulic pistons. However, these and other devices have been undesirable for various reasons. For example, weights require pulleys and cables; racks and pinions require clearance space for movement of the shutters away from the strip material; and hydraulic pistons require hydraulic lines and pumps.

Therefore, an object of the invention is to provide an improved shutter drive for pinhole detectors.

Another object of the invention is to provide a pinhole detector shutter drive which is relatively simple in construction and operation.

Another object of the invention is to provide a pinhole detector shutter drive which also serves to reduce the stray light that reaches the light sensitive device.

Another object of the invention is to provide a pinhole detector shutter drive which is relatively compact and which requires very little space or clearance even when the shutters are separated a relatively large distance to accommodate wide strip material.

These and other objects are accomplished in accordance with the invention by the use of two flexible, elongated drive strips. The drive strips are respectively fastened at one end to the two shutters. The drive strips extend outwardly from the shutters between the light source and the light sensitive device and thus reduce the amount of stray light which reaches the light sensitive device. Drive means, preferably in the form of friction wheels, are positioned on each side of the path of the strip material. The drive means move the drive strips back and forth to thereby move the shutters back and forth away from and toward the strip material. Since the drive strips are flexible, the portions outside the drive means (i.e., any excess length of the drive strips) can be coiled or wound in a small volume or space, thus providing a relatively small clearance or space requirement for the drive strips.

The invention may be better understood from the following description given in connection with the accompanying drawing, and the scope of the invention will be pointed out in the claims. In the drawing:

FIGURE 1 shows a side view of a pinhole detector utilizing the drive strips of the invention, the view of FIGURE 1 being end-on with respect to the path of strip material;

FIGURE 2 shows an enlarged cross-sectional view of a portion of the pinhole detector taken along the lines 2—2 in FIGURE 1; and FIGURE 3 shows a cross-sectional view taken along the lines 3—3 in FIGURE 2.

The pinhole detector shown in FIGURE 1 has been positioned or oriented so that it is viewed with the strip material moving in a path perpendicular to the plane of FIGURE 1. The strip material usually inspected by such a pinhole detector may be hundreds or thousands of feet in length, several feet in width, and less than an inch in thickness. Therefore the strip material passes through the pinhole detector by moving along its length so that the pinhole detector must be able to accommodate the width and thickness of the strip material. The pinholes to be detected are through the thickness of the strip material. This strip material has some width as indicated in FIGURE 1, and follows a path between a light source 10 and an enclosed chamber 12 which houses one or more light sensitive devices. The light source 10 may comprise any suitable source of light that preferably extends the full length of the chamber 12 and that shines down on the chamber 12 and the strip material. The length of the light source 10 and the chamber 12 are made sufficiently long to accommodate the widest piece of strip material to be expected. Two movable shutters 14 are positioned on either side of the path of the strip material, that is, on or at the side edges of the strip material. These shutters 14 move along a guide so as to prevent or reduce the amount of stray light provided by the source 10 or any other source from reaching the light sensitive devices in the chamber 12 by traveling around the edge of the strip material. As may be best seen in FIGURE 2, the chamber 12 is provided with a top cover 16 which extends longitudinally along the length of the chamber 12. A longitudinal slot 18 is placed in the cover 16, this slot being arranged or positioned so that its length is substantially transverse to the path or direction of travel of the strip material. The chamber 12 is provided with one or more light sensitive devices which, on receipt of light from the source 10, provide an output signal. Normally, with the strip material passing along its path between the light source 10 and the chamber 12, no light reaches the light sensitive devices. However, if a flaw or pinhole is present in the strip material, a small amount of light passes through this pinhole and through the slot 18 to reach the light sensitive devices. When the light sensitive devices receive any light, they provide a signal which can be utilized in any desired way to indicate the presence of a pinhole or light admitting flaw in the strip material. The light source 10 and the chamber 12 with its light sensitive devices as thus far described are known in the art. Additional explanation and discussion of such a light source and chamber are given in Patent No. 2,947,876, granted August 2, 1960 to J. J. Larew.

The shutters 14 are provided in order that stray light from the source 10 or any other source be prevented from passing or traveling around or outside the edges of the strip material and reaching the slot 18 of the chamber 12. These shutters 14 are preferably positioned very close to the edge of the strip material so as to prevent as much light as possible from passing around the edge of the strip material. In some applications, particularly where the strip material is relatively thick or heavy. the shutters 14 may press or bear directly against the edge of the strip material. However, in other instances, particularly where the strip material is relatively thin or light, the shutters 14 should be spaced just slightly away from the edge of the strip material so as to prevent damage to the strip material as it moves along its path between the shutters 14. The shutters 14 may have a number of known designs such as the one shown in Patent No. 2,979,984, granted April 18, 1961 to E. R. Rosen. If the shutters 14 are to bear directly against the edges of the strip material, they may be constantly pressed or driven against the edges of the strip material by a suitable force or pressure. However, if the shutters 14 are to be spaced some predetermined distance away from the edges of the strip material, they may be provided with a servo control which may utilize light sources and light sensitive devices or other devices which are mounted in the shutters. These devices provide control signals which control drive means that move the shutters 14 back and forth in accordance with the position of the edge of the strip material. Such a servo controlled shutter is described and shown in Patent No. 2,981,845, granted April 25, 1961 to J. J. Larew and J. K. Snell. The drive strips of the invention may be used to drive the shutters 14 with either a constant force or pressure arrangement or with a servo control arrangement.

In accordance with the invention and with reference to FIGURE 1, two elongated and flexible or bendable drive strips 20 are respectively fastened at one end to the two shutters 14. The drive strips 20 are preferably metallic and preferably bend at least along lines parallel to their width. In a working embodiment, the drive strips 20 were each made of spring steel that was 30 inches long, 3.5 inches wide, and 0.015 inch thick. The drive strips 20 extend outwardly from the shutters 14 and away from the edges of the strip material. As will be explained with particular reference to FIGURE 2, the drive strips 20 are positioned relative to the chamber 12 so as to not only provide drive for or movement of the shutters 14 but so as to also provide a light shield for the slot 18 in the cover 16. The drive strips 20 extend back toward respective drive housings 22 which are positioned at the outer ends of the chamber 12. As viewed in FIGURE 1, the right-hand drive housing 22 is shown in partial section to show further details of the drive mechanism for the drive strips 20. The drive housings 22 are each provided with a suitable and appropriately positioned opening 24 for admitting the drive strip 20 into the drive housing 22. Each drive strip 20 passes between a drive wheel 26 and an idler wheel 28. In a preferred embodiment, these wheels 26, 28 may be made of rubber or a similar material so as to frictionally press or bear against opposite faces of the drive strip 20. The idler wheel 28 may be provided with a suitable adjustment (not shown) for controlling the amount of pressure exerted on the drive strip 20. The drive wheel 26 is coupled by a belt or other suitable coupling 29 to a power wheel 30 which may be coupled directly to the shaft of an electric motor (not shown). Operation of the electric motor may be controlled by signals provided by a servo control mounted on the shutters 14, or by any other suitable source. Operation of the motor and power wheel 30 is transferred through the belt 29 to the drive wheel 26. When the drive wheel 26 rotates, it causes the drive strip 20 to move in an appropriate direction, and this movement of the drive strip 20 causes corresponding movement of the shutter 14.

As the width of strip material varies, this variation may be readily accommodated without the necessity of additional clearance or space on either side of the chamber 12 or the drive housings 22. This is achieved by coiling or winding the excess or unused portion of the drive strip 20 within the drive housing 22. This winding or coiling is achieved by a winding arm 32 which rotates about a pivot 34. The end of the drive strip 20 is attached to the winding arm 32 and as the drive strip 20 moves in or out, the winding arm 32 moves clockwise or counterclockwise to accommodate this movement. Thus, it will be seen that very little additional space or clearance is required to accommodate a fairly large back and forth movement of the shutters 14, because of the fact that the drive strip 20 is wound or coiled in a curve or circle by means of the winding arm 32.

The details of one of the shutters 14 and its drive strip 20 with relation to the chamber 12 and its cover 16 are shown in FIGURES 2 and 3. FIGURE 2 is an enlarged cross-sectional view taken along the lines 2—2 in FIGURE 3 is a cross-sectional view taken along the lines 3—3 in FIGURE 2. Two horizontal grooves 36 are provided on either side of the slot 18 (i.e., along the path of the strip material). These grooves 36 extend all the way across the length of the chamber 12 to accommodate or receive the drive strips 20. The grooves 36 are relatively thin or narrow so that the drive strips 20 occupy a large portion of the grooves 36. This feature thus provides an arrangement which prevents substantially any light from passing around the edges of the drive strips 20 and reaching the slot 18 in the cover 16. To further prevent leakage of light around the edges of the strip material, each of the shutters 14 may be provided with an upper plate 38 and a lower plate 40 which may be beveled in opposite directions from the path of the strip material so as to provide a throat or channel through which the strip material may pass. The lower plate 40 of the shutter 14 is suitably fastened to the drive strip 20, and the entire shutter 14 is provided with wheels or rollers 42 which run on the top of the chamber 12. It will be seen that the structure or plate which forms the groove 36 for the drive strip 20 serves as a guide for the drive strip 20 and may also serve as a guide for the shutter 14. This will insure that the shutters 14 and the drive strips 20 move back and forth along the proper line with respect to the chamber 12. Additional guide means in the form of tracks 44 may be provided for the wheels 42 to further insure proper movement of the shutter 14.

From the description given, it will be seen that the shutter drive in accordance with the invention provides an improved pinhole detector. The shutter drive may be operated from conventional devices such as an electric motor, and provide a relatively large range of movement or speed of the shutters without requiring the additional clearance or space that would be required by a conventional rack and pinion arrangement. In addition, the shutter drive provides means for shielding the light sensitive devices from stray light sources or from heat in the form of radiant energy in the areas where no strip material is passing, and thus serves the dual function of driving the shutters as well as shielding. Persons skilled in the art will appreciate that modifications of the invention as described may be made. For example, the drive strips may be provided with suitable holes so as to be driven by a sprocket rather than by frictional engagement. And instead of being operated by a motor and a servo control, the drive strips may be suitably biased by some means such as a torsion spring acting on the winding arm and pivot for constantly urging the drive strips and the shutters against the edges of the strip material. However, such modifications will be apparent to persons skilled in the art. Therefore, while the invention has been described with reference to a particular embodiment, it is to be understood that modifications may be made without departing from the spirit of the invention or from the scope of the claims.

What I claim as new and desire to secure by Letters Patent of the United States is:

1. Inspection apparatus for detecting pinholes in material that moves along a path, comprising a source of light on one side of said path, a light sensitive device located on the opposite side of said path in a chamber having a slot, a shutter supported to move in a longitudinal direction along the length of the slot in said chamber between said light source and said slot, a flexible drive strip one end of which is fastened to said shutter to control its position along said slot, the width of said drive strip being greater than the width of said slot, means connected to the other end of said drive strip for driving said strip back and forth to move said shutter, said drive strip being rigid enough to permit it to induce said back and forth movement of said shutter under control of said driving means, and means located in proximity to said slot and having surfaces which cooperate with the drive strip for guiding said drive strip in a direction parallel to the longitudinal axis of said slot while preventing substantially any light leakage around the edges of said drive strip to said light sensitive device.

2. The combination of claim 1 in which said surfaces form grooves for receiving the opposed edges of said drive strip, the width of said grooves being slightly larger than the thicknesses of the respective opposed edges of said drive strip.

3. Inspection apparatus for detecting pinholes in material that moves along a path, comprising a source of light and a light sensitive device positioned on opposite sides of said path, said light sensitive device being provided with a cover that is positioned between said sensitive device and said path and that has an elongated slot extending in a transverse direction relative to said path, guide means extending along said cover parallel to said slot, first drive means positioned in the vicinity of one end of said cover, second drive means positioned in the vicinity of the opposite end of said cover, first and second elongated strips of material which are flexible in at least one dimension and which are respectively driven by said first and second drive means, said strips extending inwardly of said drive means between said cover and said source and being guided by said guide means, and first and second shutters respectively fastened to said first and second strips, said shutters extending inwardly of said strips between said cover and said source and being guided by said guide means, said shutters and said strips serving to reduce the amount of light from said source which reaches said sensitive device around the edges of said material.

4. The apparatus of claim 3 wherein said drive means are in frictional engagement with opposite surfaces of said strips.

5. The apparatus of claim 3 and further including means for coiling the outer ends of said strips relative to said drive means as they are driven back away from said path.

References Cited by the Examiner

UNITED STATES PATENTS

| | | | |
|---|---|---|---|
| 2,506,599 | 5/1950 | Jordan | 250—219 |
| 2,886,716 | 5/1959 | Camp | 88—14 |
| 2,820,908 | 1/1958 | Linderman | 250—219 |
| 2,979,984 | 4/1961 | Rosen | 88—14 |
| 2,981,845 | 4/1961 | Larew et al. | 250—219 |

RALPH G. NILSON, *Primary Examiner.*